Figure 1:
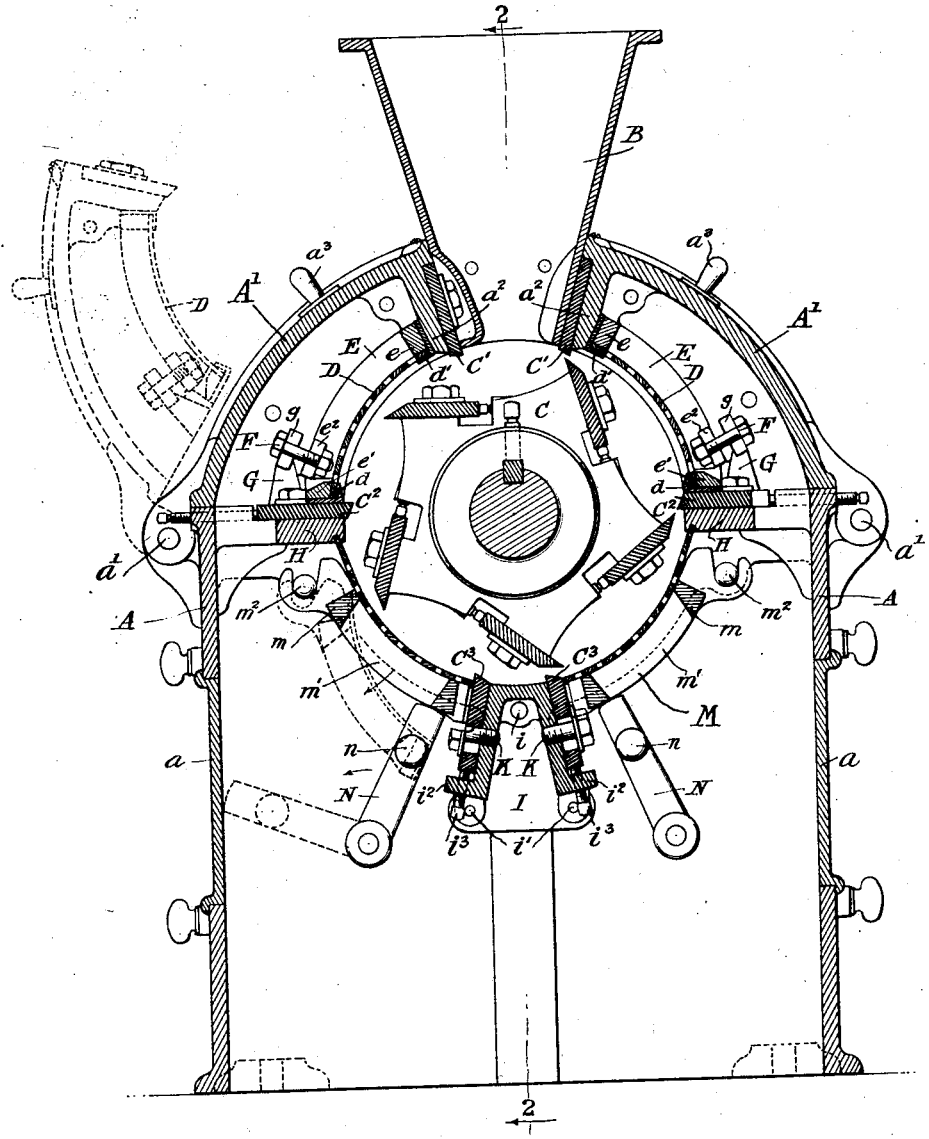

April 17, 1928.  
S. SNYDER  
1,666,797  
GRAIN CRACKING MACHINE  
Filed Aug. 10, 1927  
2 Sheets-Sheet 1

INVENTOR.

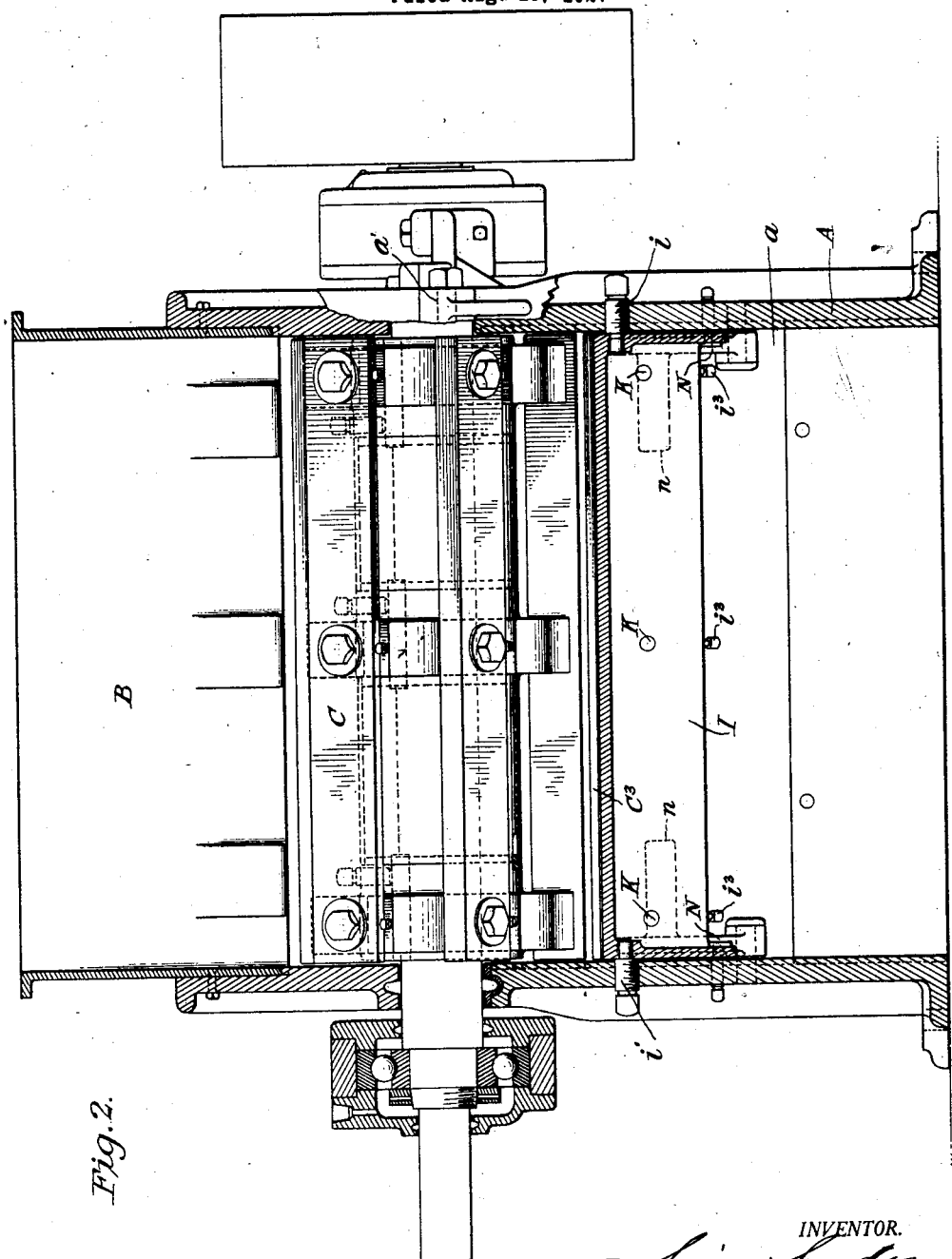

Patented Apr. 17, 1928.

1,666,797

UNITED STATES PATENT OFFICE.

SIMON SNYDER, OF MUNCY, PENNSYLVANIA, ASSIGNOR TO SPROUT, WALDRON AND COMPANY, OF MUNCY, PENNSYLVANIA, A CORPORATION OF PENNSYLVANIA.

GRAIN-CRACKING MACHINE.

Application filed August 10, 1927. Serial No. 212,126.

This invention relates to machines of the character shown in Patent No. 1,560,433, granted me, assignor to Sprout, Waldron and Company, November 3, 1925, Reissue No. 16,759, dated October 4, 1927, for a grain cracking or reducing machine, and one object of the invention is to improve the construction and increase the efficiency of such machines.

In the patented machine there is a casing having a feed hopper thereon and a rotary cutter or rotary knife-blades therein arranged in co-operative relation to stationary knives on opposite sides of the rotary cutter, which is encircled by a sectional screen, the upper sections of which are spaced from the inner wall of the casing so as to provide suitable spaces above the rotary knives to receive material thrown out by the knives as they revolve, while the lower section of the screen extends across an open space below the rotary knives, so that the material thrown out by the knives is allowed to descend by gravity into the lower part of the casing.

A further object is to provide simple and efficient means for attaching and supporting a stationary knife or knives below the rotary knives and to adapt the lower section of the encircling screen to be easily and quickly removed so as to afford access to the rotary knives, or for the purpose of repairing or replacing a worn or broken part.

Another object is to provide upper casing members pivotally supported upon a base member so that they may swing outwardly into position to permit the upper screen sections carried thereby to be easily removed and replaced or to afford access thereto for cleaning or repairs.

The invention will first be hereinafter more particularly described, with reference to the accompanying drawings, which are to be taken as a part of this specification, and then pointed out in the claims at the end of the description.

In said drawings, Fig. 1 is a vertical sectional view of a machine embodying my invention; one of the upper hinged casing members being indicated by dotted lines in raised position to permit access to the screen section carried thereby in spaced relation to its inner wall; and Fig. 2 is a vertical longitudinal sectional elevation taken on the line 2—2 of Fig. 1.

Referring to said drawings, in which the same reference characters are used to denote corresponding parts in different views, the letter A denotes the base member of the casing, which has openings in opposite sides thereof in which are removably secured suitable doors $a$ for closing said openings, through which access is afforded to parts of the machine within the lower casing member. The upper casing members $A^1$ which, as shown, are of segmental form, are hinged at their lower ends, as at $a^1$, to the lower casing member A, while their upper ends in normal position abut against opposite sides of the lower portion of a feed hopper B arranged about the rotary cutter C. The cutter C consists of a series of knife-blades revolubly mounted within the casing and arranged in co-operative relation to a series of stationary knives arranged as hereinafter described. Each of the casing members $A^1$ is formed or provided at its upper end with a depending flange $a^2$ and has secured therein a screen section D which is spaced from the inner wall of the casing member so as to provide an arcuate space to receive granulated material as it is thrown outwardly into said space by the rotary cutter. The screen or screen sections D, consisting preferably of foraminous metal plates, are supported at their lower ends upon flanged or angle-iron plates $d$ and at their upper ends upon the lower flanges of similar angle iron plates or brackets $d^1$ which abut against the depending flanges $a^2$ on the upper ends of the casing members $A^1$. To hold the screen sections in place rectangular frame members E, having top and bottom cross-bars $e$, $e^1$, are forced against opposite ends of the screen sections D by fastening devices comprising bolts F connecting lugs $e^2$ on the frame members E with lugs $g$, on upright castings or brackets G at the lower end of the frame member E having an upwardly inclined surface confronting a reversely inclined lower end-portion of the frame member bearing thereon so that when the bolts F are tightened by screwing up the nuts thereon, the lower ends of the frame members being in sliding contact with the reversely inclined surfaces of the castings G, the cross-bars $e$ and $e^1$ will be forced tightly against the screen sections so as to bind and hold them in place. The bolts F are fitted in open-ended slots in the lugs $e^2$ and $g$ so that they may be easily removed when desired to remove or replace the screen. Upper stationary knives C¹ may be conveniently adjustably secured in recesses formed between the outer side walls of the feed hopper and the inner sides of the depending flanges $a^2$, while horizontally disposed knives C² are adjustably secured upon shelf-like knife-supports H, extending inwardly from the lower casing member A, and additional stationary knives C³ are adjustably secured upon the outer sides of a fixed knife-support or casting I of inverted trough-like form arranged below the rotary cutter. This support extends across the lower part of the casing and is secured thereto by bolts or screws $i$ having preferably large body portions and reduced end-portions which are inserted in holes in opposite ends of the support, while smaller bolts or screws are inserted in holes in the ends of the support below the larger screws, so that said support may be readily removed by unscrewing said screws. The sides of the support I, diverge toward the lower open-ended side thereof and are provided with laterally extending slightly upwardly inclined flanges $i^2$ in wceih interiorly threaded apertures are formed to receive set screws $i^3$ which bear against the rear ends of the knives C³ for adjustably securing them in place. Said knives have slotted shanks and fastening bolts K passing through the slots are screwed into interiorly threaded apertures in the inclined sides of the fixed support for securing the knives in fixed positions. On opposite sides of the fixed knife-support I are secured screen supports M consisting of bars $m$, which extend longitudinally of the casing, and transverse bars $m^1$, connecting the longitudinal bars and having their upper ends forked or provided with open-ended slots to receive studs or pins $m^2$, projecting from the inner sides or ends of the lower casing member so that by upward pressure on the screen support it will be sustained in a fixed position while adapted to be easily removed by releasing the pressure-applying means. The lower ends of the transverse bars $f$ of said screen supports abut against opposite sides of the fixed knife-support I, and are held thereagainst by hinged or pivotally connected levers N, which are pivoted at their lower ends to the inner sides of the ends of the lower casing member A, so that when the levers are in the full line position shown in Fig. 1, their free ends will bear against the under side of one of said transverse bars of the screen supporting frame and hold the latter in place; but by throwing the levers into the dotted line position indicated in Fig. 1 the screen and its supporting frame may be readily removed. For convenience in manipulating the levers N they are each provided with an operating handle $n$, and for conveniently raising the sections A¹ of the casing they are each provided with a handle $a^3$.

By the described construction and arrangement of parts the stationary knives are spaced apart in circular series around a circular series of rotary knives, which are encircled by the screen, and suitable spaces or chambers are provided both above and below the rotary cutter to receive granulated material thrown out by the rotary knives; the shelf-like supports for the horizontally disposed knives being so constructed that suitable openings are provided through which material thrown into the upper chambers may pass freely into the lower chamber or lower part of the casing where it is commingled with material passing through the lower part of the encircling screen, whereby the efficiency and capacity of the machine in reducing grain is greatly increased and the quantity of meal or undesired product ordinarily produced in machines of the same type as heretofore constructed is considerably reduced, while the several parts of the machine are made readily accessible for cleaning or repairing or for removing and replacing a worn or broken part, and the lowermost stationary knives are firmly sustained in operative position so as to prevent vibratory movement or wobbling of the lower screen support, with consequent liability of dismembering or injuring the same when excess pressure is exerted thereon by the crowding of grain or other material between the rotary and lowermost stationary knives.

While I preferably employ circular series of rotary and stationary knives and an encircling screen in sections corresponding with the spacing of the stationary knives, it will be understood of course that other arrangements may be used, and I do not desire to be limited in the appended claims to the specific arrangement shown and described.

Having thus described my invention, what I claim as new and desire to secure by Letters Patent of the United States is:

1. A grain cracking or reducing machine comprising a casing containing rotary knives and stationary knives spaced apart around the rotary knives and a superposed feed hopper; said casing comprising a lower member having mounted thereon upper members of segmental form each having its lower end hinged to the lower member and having secured on the inner side thereof a perforated plate or screen spaced from its inner wall so as to provide an arcuate space for receiving granulated material; such material being caused to descend by gravity into the lower part of the casing.

2. In a grain cracking or reducing machine, a casing having a series of knives revolubly mounted therein, and stationary knives spaced apart around the rotary knives, including a stationary knife, located below the rotary knives; said casing having upper members of segmental form mounted upon and hinged to a lower supporting member and each having a screen spaced from the inner wall thereof so as to provide suitable spaces above the rotary knives to receive granulated material thrown out by the rotary knives, and a feed hopper supported between said segmental members.

3. A grain cracking or reducing machine comprising a casing having a feed hopper thereon supported between upper casing members of segmental form each mounted upon and hinged at its lower end to a base member, rotary knives arranged within the casing, stationary knives arranged in circular series around the rotary knives; certain of the stationary knives being arranged below the rotary knives, and a sectional screen encircling the rotary knives; the screen sections above the rotary knives being spaced from the inner walls of said segmental casing members so that suitable spaces are provided above the rotary knives to receive granulated material which is caused to descend by gravity into the lower part of the casing.

4. In a grain cracking or reducing machine, a casing having a series of knives revolubly mounted therein, and stationary knives spaced apart around the rotary knives, certain of said stationary knives being located below the rotary knives; said casing having upper members of segmental form mounted upon and hinged to a lower supporting member and each having a screen spaced from the inner wall thereof so as to provide suitable spaces above the rotary knives to receive granulated material thrown out by the rotary knives, a feed hopper supported between said segmental members, and means for sustaining the stationary knives and associated screen below the rotary knives in a relatively fixed position; said means comprising a fixed knife-support and a screen support in two parts each arranged to bear against one side of said fixed knife-support, and means for sustaining said parts in fixed positions; said sustaining means being releasable to permit said parts to be removed.

5. The combination, in a machine of the character described, having rotary knives arranged within an enclosing casing and stationary knives arranged in co-operative relation to the rotary knives, a pair of knives arranged below the rotary knives, perforated plates or screens arranged on opposite sides of said pair of knives, and means for supporting said pair of knives and associated screens in fixed relation to the rotary knives; said means comprising a fixed knife-support, frame structures on opposite sides of said support having longitudinal and transverse bars; said transverse bars having forked upper ends engaging fixed studs or pins on the inner side of the casing while their lower ends bear on said fixed knife-support, and swinging levers normally engaging said frame structures on the under side thereof so as to force and hold the forked ends of said transverse bars in engagement with said studs or pins; said levers being adapted to swing out of engagement with said frame structures so as to permit them and the screens thereon to be removed.

6. A machine of the character described comprising rotary and stationary knives arranged in co-operative relation within an enclosing casing; stationary knives being arranged above and below the rotary knives, and a sectional screen encircling the rotary knives, the upper sections being spaced from the inner walls of the casing so as to provide suitable spaces above the rotary knives to receive material thrown out by the knives; the lowermost knives being secured to a fixed support while the lower screen members are removably supported adjacent the lowermost knives, and means for releasably securing the supports for said lower screen members in fixed positions; said means including a swinging lever for each support adapted to swing into engagement therewith and hold it firmly in place and to swing out of engagement so that the support may be removed for renewing or replacing worn or broken parts and to afford access to the rotary knives.

7. In combination, a casing comprising a base portion supporting segmental upper portions hinged thereto, said casing having a shaft revolubly mounted therein carrying rotary knives, stationary knives arranged in circular series around the rotary knives, a screen encircling the rotary knives in spaced relation to the inner walls of the casing so as to provide grain receiving chambers above and below the rotary knives; the lowermost stationary knives being secured to a fixed knife-support and perforated plates or screen members removably supported on opposite sides of said fixed knife-support below the rotary shaft.

8. In a grain cracking or reducing machine, a casing having upper members mounted upon and hinged to a lower casing member, a rotary cutter within said casing, and stationary cutters spaced apart around the rotary cutter, including a stationary cutter located below the rotary cutter; said upper casing members each having a screen spaced from the inner wall thereof so as to provide suitable spaces above the rotary cutter to receive granulated material thrown out by the latter cutter, and a feed hopper supported upon the casing.

9. A grain cracking or reducing machine comprising a casing having a rotary cutter therein and stationary cutters spaced apart around the rotary cutter, including a stationary cutter attached to a fixed support arranged below said rotary cutter, screen-supports detachably secured on opposite sides of said fixed support, each having a screen thereon, and means for sustaining each of said screen-supports in a fixed position; said sustaining means releasably engaging the screen-support.

In testimony whereof I affix my signature.

SIMON SNYDER.

CERTIFICATE OF CORRECTION.

Patent No. 1,666,797.  
Granted April 17, 1928, to

SIMON SNYDER.

It is hereby certified that error appears in the printed specification of the above numbered patent requiring correction as follows: Page 1, line 71, for the word "about" read "above"; page 2, line 28, for the misspelled word "whcih" read "which"; and that the said Letters Patent should be read with these corrections therein that the same may conform to the record of the case in the Patent Office.

Signed and sealed this 29th day of May, A. D. 1928.

(Seal)

M. J. Moore,  
Acting Commissioner of Patents.